(12) United States Patent
Soon-Shiong et al.

(10) Patent No.: US 11,861,410 B2
(45) Date of Patent: Jan. 2, 2024

(54) CLOUD COMPUTING BURST INSTANCE MANAGEMENT THROUGH TRANSFER OF CLOUD COMPUTING TASK PORTIONS BETWEEN RESOURCES SATISFYING BURST CRITERIA

(71) Applicant: Nant Holdings IP, LLC, Culver City, CA (US)

(72) Inventors: Patrick Soon-Shiong, Los Angeles, CA (US); Aaron Randolph Bassett, Laconia, NH (US); John Wiacek, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 348 days.

(21) Appl. No.: 17/179,049

(22) Filed: Feb. 18, 2021

(65) Prior Publication Data
US 2021/0255902 A1    Aug. 19, 2021

Related U.S. Application Data

(60) Provisional application No. 62/978,577, filed on Feb. 19, 2020.

(51) Int. Cl.
*G06F 9/50* (2006.01)
*G06F 9/455* (2018.01)

(52) U.S. Cl.
CPC ........ *G06F 9/5072* (2013.01); *G06F 9/45558* (2013.01); *G06F 9/5027* (2013.01); *G06F 9/5077* (2013.01); *G06F 9/45533* (2013.01); *G06F 9/5083* (2013.01); *G06F 2009/45595* (2013.01)

(58) Field of Classification Search
CPC .. G06F 9/5072; G06F 9/45558; G06F 9/5027; G06F 9/5077; G06F 2009/45595; G06F 9/5083; G06F 9/45533
See application file for complete search history.

(56) References Cited

U.S. PATENT DOCUMENTS

| | | | |
|---|---|---|---|
| 7,281,031 B1 * | 10/2007 | Wang | H04L 12/4625 709/213 |
| 8,364,744 B2 | 1/2013 | Wittenschlaeger | |
| 10,218,732 B2 | 2/2019 | Wittenschlaeger | |
| 10,346,654 B2 | 7/2019 | Hochhalter et al. | |

(Continued)

*Primary Examiner* — Michael W Ayers
(74) *Attorney, Agent, or Firm* — Harness Dickey & Pierce P.L.C.

(57) ABSTRACT

An example cloud computing burst management system includes a first cloud computing resource including a first processor and a first memory, a second cloud computing resource including a second processor and a second memory, and one or more data networks connecting the first cloud computing resource and the second cloud computing resource. The first cloud computing resource is configured to perform at least one cloud computing task, and to monitor one or more leading indicator parameters associated with operation of the first cloud computing resource while performing the at least one cloud computing task. In response to the one or more leading indicator parameters satisfying a first burst criteria, the first cloud computing resource is configured to provision a task instance on the second cloud computing resource for performing at least one portion of the cloud computing task.

14 Claims, 4 Drawing Sheets

(56) References Cited

U.S. PATENT DOCUMENTS

| | | | |
|---|---|---|---|
| 10,445,134 B2* | 10/2019 | Borthakur | G06F 9/4856 |
| 10,594,549 B2 | 3/2020 | Soon-Shiong et al. | |
| 11,038,986 B1* | 6/2021 | Acar | H04L 67/10 |
| 2006/0155912 A1* | 7/2006 | Singh | G06F 9/5088 |
| | | | 711/6 |
| 2010/0115097 A1* | 5/2010 | Gnanasambandam | G06F 9/5027 |
| | | | 709/226 |
| 2011/0047555 A1* | 2/2011 | Lakshmanan | G06F 9/5088 |
| | | | 718/105 |
| 2012/0304191 A1* | 11/2012 | Morgan | G06F 9/5088 |
| | | | 718/105 |
| 2012/0310765 A1* | 12/2012 | Masters | G06F 9/4856 |
| | | | 709/224 |
| 2012/0311154 A1* | 12/2012 | Morgan | G06F 9/5072 |
| | | | 709/226 |
| 2016/0098285 A1* | 4/2016 | Davis | G06F 9/45545 |
| | | | 718/1 |
| 2018/0241812 A1* | 8/2018 | Marchetti | H04L 67/1023 |
| 2022/0141099 A1* | 5/2022 | Prasanna Kumar | H04L 47/823 |
| | | | 709/224 |

* cited by examiner

CLOUD COMPUTING BURST INSTANCE MANAGEMENT THROUGH TRANSFER OF CLOUD COMPUTING TASK PORTIONS BETWEEN RESOURCES SATISFYING BURST CRITERIA

CROSS-REFERENCE TO RELATED APPLICATION

This application claims the benefit of U.S. Provisional Application No. 62/978,577, filed on Feb. 19, 2020. The entire disclosure of the above application is incorporated herein by reference.

FIELD

The present disclosure generally relates to cloud computing technologies including managing burst instances in cloud computing systems.

BACKGROUND

Cloud computing typically includes on-demand availability of computer resource systems, such as data storage and computing power, and may not require direct active management by a user. For example, data centers may be available over the Internet to many users, and functions may be distributed over multiple locations. Cloud computing environments may provide burst computing capabilities with high computing power at certain periods of peak demand.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one example embodiment of the present disclosure, an example cloud computing burst management system includes a first cloud computing resource including a first processor and a first memory, a second cloud computing resource including a second processor and a second memory, and one or more data networks connecting the first cloud computing resource and the second cloud computing resource. The first cloud computing resource is configured to perform at least one cloud computing task, and to monitor one or more leading indicator parameters associated with operation of the first cloud computing resource while performing the at least one cloud computing task. In response to the one or more leading indicator parameters satisfying a first burst criteria, the first cloud computing resource is configured to provision a task instance on the second cloud computing resource for performing at least one portion of the cloud computing task.

According to another example embodiment of the present disclosure, a computer-implemented method of managing burst instances in a cloud computing system is disclosed. The system includes a first cloud computing resource having a first memory and a first processor for performing at least one cloud computing task, a second cloud computing resource having a second processor and a second memory, and one or more data networks connecting the first cloud computing resource and the second cloud computing resource. The method includes monitoring, by the first cloud computing resource, one or more leading indicator parameters associated with operation of the first cloud computing resource while performing the at least one cloud computing task. In response to the one or more leading indicator parameters satisfying a first burst criteria, the method includes provisioning, by the first cloud computing resource, a task instance on the second cloud computing resource for performing at least one portion of the cloud computing task.

According to yet another example embodiment of the present disclosure, a non-transitory computer readable medium includes computer-executable instructions. The computer-executable instructions are executable by a processor to perform, by a first cloud computing resource having a first memory and a first processor, at least one cloud computing task. The instructions are executable by the processor to monitor, by the first cloud computing resource, one or more leading indicator parameters associated with operation of the first cloud computing resource while performing the first cloud computing resource. In response to the one or more leading indicator parameters satisfying a first burst criteria, the computer-executable instructions are executable by a processor to provision, by the first cloud computing resource, a task instance on a second cloud computing resource for performing at least one portion of the cloud computing task.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

DETAILED DESCRIPTION

Burst Instance Management System

Figure 1:
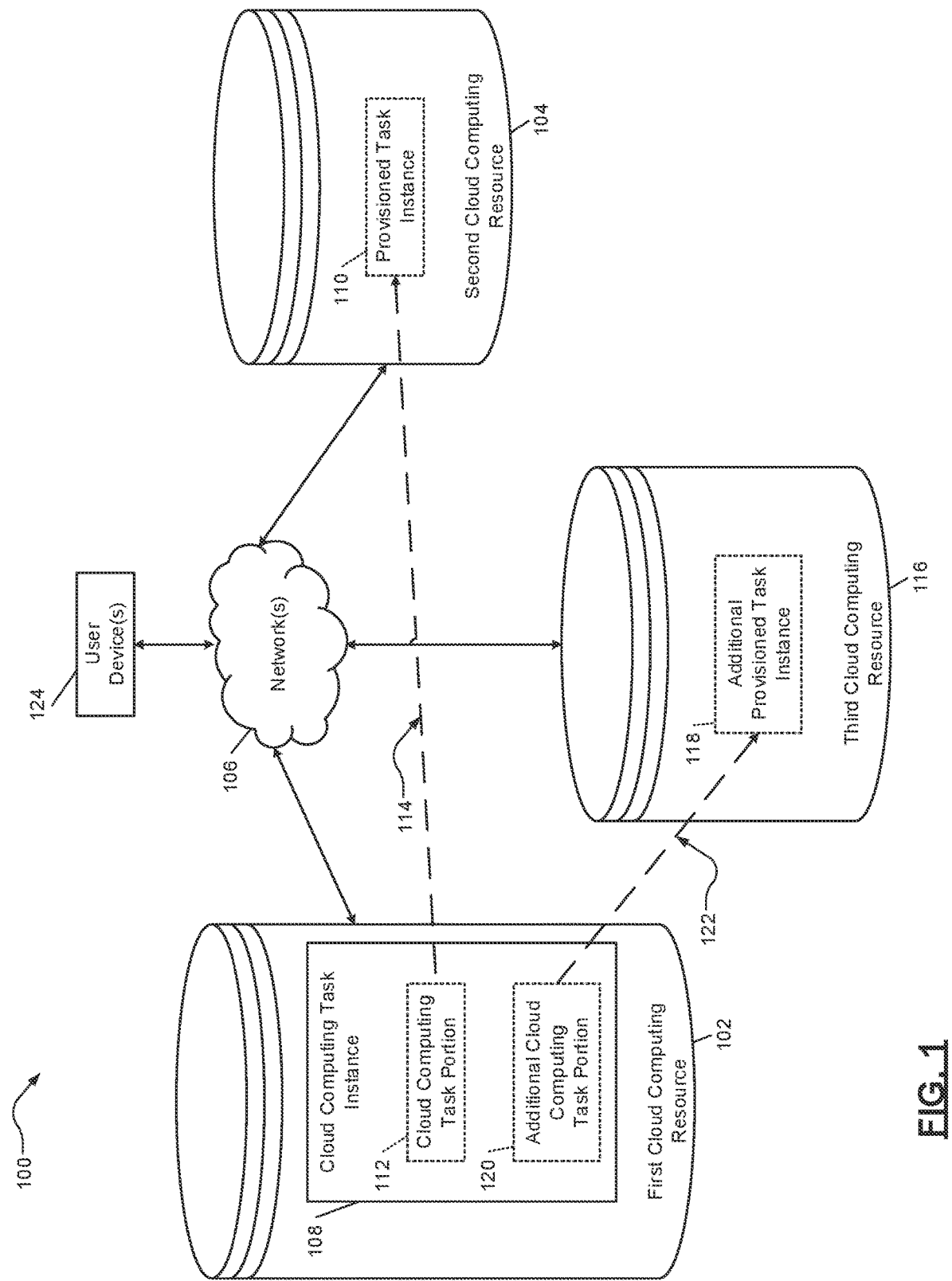
FIG. 1 is a functional block diagram of a cloud computing burst management system, according to one example embodiment of the present disclosure.

FIG. 1 illustrates an exemplary system 100, in which one or more aspects of the present disclosure may be implemented. Although the system 100 is presented in one arrangement in FIG. 1, other embodiments may include systems arranged otherwise depending, for example, on a manner in which components of the network communicate with one another, locations and numbers of the components of the network, etc.

In the illustrated embodiment, the system 100 generally includes a first cloud computing resource 102 configured to perform at least one cloud computing task 108 (e.g., via one or more processors and memories of the first cloud computing resource 102, etc.). The system 100 also includes a second cloud computing resource 104, and one or more data networks 106 connecting the first cloud computing resource 102 and the second cloud computing resource 104.

The first cloud computing resource 102 monitors one or more leading indicator parameters associated with operation of the first cloud computing resource 102 while performing the at least one cloud computing task 108. In response to the one or more leading indicator parameters satisfying a first burst criteria, the first cloud computing resource 102 is configured to provision a task instance 110 on the second cloud computing resource 104 for performing at least one portion 112 of the cloud computing task 108. Example pseudo code for determining when the burst criteria are met is provided below. In particular, below are example loops for checking all resources, and an example resource check function.

```
// Description: checks all resources, and updated alloca-
tions, loops through all resources
    void monitorResources( ){
    int resourceStatus;
    for(int i=0; i<resourceCount; i++){// iterate through all
        the resources
        resourceStatus=resources[i].checkResource( ); // check
            if resource is good and combine with status if one
            variable is false then all is false
        if(resourceStatus==0){// need to allocate resources
            newresource=resources[i].allocResource( );
            if (Need to shard){// check if we need to split the task
                Shard( ); // split the task
            }
            else{
                updateTask( )// update the task with new resources
            }
        }else  if(resourceStatus==-1){//   can   deallocate
            resources
            resources[i].deallocResource( );
        }
    }
}// end of void monitorResources( ) function
// Description: the check resource checks the status of its
resource and returns if there is a need to change allocations
of the resource // Return: 1—all is good and there is no need
for allocations/deallocations // 0—allocation needed for the
resource // −1—deallocation is needed, allocation is much
higher than needed
    int checkResource( ){
    float currentTime; // current time
    float changeUtil; // change in utilization since last check
    float changeTime; // elapse time since last check
    float resourceUtil; // variable for storing the current
        resource utilization
    float predicted; // prediction for next time utilization
    curResourceUtil=getResourceUtil(rType); // gets the cur-
        rent resource utilization from the system of type rType
        this will have to be implemented or connected to
        system
    currentTime=getCurrentTime( ); // get the current time for
        the system
    changeUtil=curResourceUtil−utilHist[history]; // calcu-
        late the change in utilization since last check
    changeTime=currentTime−lastTime; // calculate the
        elapse time since last check
    utilHist[history]=curResourceUtil; // set lastUtil for next
        time a check is preformed this is needed for predictive
        calculations
    history++; // increment the number of items in history to
        analyze
    lastTime=currentTime; // set lastTime for next time a
        check is preformed this is needed for predictive calcu-
        lations
    if(curResourcUtil>thresholdMax){// check if the current
        resource utilization exceeds the maximum threshold
        return 0; // return 0, resource is above maximum
            threshold and an allocation of additional resource
            needs to be preformed
    }else if (curResourceUtil<thresholdMin){// check if cur-
        rent resource utilization falls below minimum utiliza-
        tion and can be partially deallocated
        return −1; // return −1, resource is below minimum
            threshold and can be at least partially deallocated
    }
    // check if we are most likely going to exceed maximum
        utilization // this is a simple check using the previous
        utilization numbers and current utilization, this could
        use AI, historical, predictive algorithms, or other meth-
        ods available to improve performance
    if(changeUtil<=0){// utilization is the same or less as last
        check
        return 1; // return 1 to indicate allocation is good no
            change increase or lower allocation is needed
    }
    // estimate if threshold is going to be reached or exceeded
        before the next check of the resource, is the time to
        allocate the resource going to exceed the threshold next
        check
    predicted=(changeUtil/changeTime*(changeTime+alloc-
        Time))+curResourceUtil; // calculate the increase be
        next check added to increase
    if(predicted>thresholdMax){// check if the predicted uti-
        lization is in excess of the threshold max
        return 1; // return 1 to increase allocation the prediction
            is the system will exceed max
    }
    return 0; // if the function gets to this return there is no
        need for allocation or deallocation
} /// end of int checkResource( ) function
```

For example, cloud computing task 108 may be any suitable process performed by the first cloud computing resource 102, such as a graphics processing unit (GPU) task, a rendering task, a cryptographic task, a homomorphic encryption task, a blockchain task, a notarized ledger task, a distributed ledger task, a gaming task, an entertainment task, a storage task, an application specific task, an operating system task, a virtual machine task, a container task, a machine learning task, a simulation task, a data transmission task, a genomic analysis task, a data storage task, a data processing task, a communication task, a client service task, a server task, a load balancing task, another other type of computing task, etc. In various implementations, each type of task may correspond to appropriate hardware resources. For example, storage tasks may correspond to available storage devices, such as a hard disk drive (HDD), a solid-state drive (SSD), a redundant array of independent disks (RAID), memory, flash, etc.

Additional examples of cloud computing resources are virtual machines and virtual environments such as VMWare's ESXi, Oracle's VirtualBox, Parallels, Microsoft's Hyper-V, XenSource's XenServer, KVM (Kernel-based Virtual Machine), Nutaniz, etc. The additional cloud resources may be take the form of adding an additional virtual server, or resources being assigned to specific virtual servers such as memory, virtual disks, Ethernet, CPU cores, etc. This may be accomplished, for example, with real-time resources being allocated or deallocated to virtual servers, or as a new server getting allocated and transferring the old server to the newly allocated server and deallocating the old server.

The first cloud computing resource 102 may transfer (as shown by 114 in FIG. 1) the at least one portion 112 of the cloud computing task 108 to the provisioned task instance 110 on the second cloud computing resource 104, in response to the one or more leading indicator parameters satisfying a second burst criteria. Example pseudo code for transferring a task to a second resource when burst criteria are met is provided below.

```
int resourceStatus;
for(int i=0;i<resourceCount;i++){// iterate through all the
    resources
    resourceStatus=resources[i].checkResource( ); // check
        if resource is good and combine with status if one
        variable is false than all is false
    if(resourceStatus==0){// need to allocate resources
        newresource=resources[i].allocResource( );
        if (Need to shard){// check if we need to split the task
            Shard( ); // split the task
        }
        else{
            updateTask( )  // update the task with new
                resources
        }
```

The second cloud computing resource 104 may perform the at least one portion 112 of the cloud computing task 108 (e.g., using the provisioned task instance 110). Although FIG. 1 illustrates a portion 112 of the cloud computing task 108 being transferred to the second cloud computing resource 104, in other embodiments the entire cloud computing task 108 may be transferred to the second cloud computing resource 104 (e.g., with the provisioned task instance 110 performing the entire cloud computing task 108).

The first burst criteria and/or the second burst criteria may include any suitable individual criterion depending on one or more factors that may be indicative of the cloud computing task 108 approaching, trending toward, exceeding, etc., an operating capacity or a defined operating limit of the first cloud computing resource 102. For example, if the first cloud computing resource is experiencing a graphic processing unit (GPU) processing overload, a just-in-time or near-in-time offload may be performed to deal with the capacity issues. Each criterion may include a specified threshold, range, metric, parameter, etc., which may be compared with measured internal features of the system 100, measured external features of the system 100, etc.

In various implementations, the defined operating limit may be defined by a contract that must be fulfilled. For example, an entitlement may be applied such as a data per unit time that must be maintained. The first burst criteria and/or the second burst criteria may include any suitable criterion The leading indicator parameter(s) may include any suitable metrics, such as a bandwidth metric, a latency, a GPU processing metric, a processor metric, a storage metric, etc. The leading indicator parameter(s) may include a multi-dimensional set of leading indicator parameters, where the set of parameters is indicative of an expected subsequent burst within a specified time period when the set of parameters satisfies the first and/or second burst criteria. The leading indicators values may be compared against the burst criteria, where the indicator values could include attribute values, parameter values, the existence of a parameter, etc. For example, a leading indicator CPU usage percentage may be compared against criteria of, e.g., a 95% utilization to trigger provisioning of a resource. A latency of greater than a specified number of milliseconds may trigger provisioning of a resource, etc. Preferably, although not necessarily required, leading indicators may include parameters or metrics indicating that a need for resources will be necessary at a future time, but the need has not yet arisen.

For example, if a bandwidth drops below a threshold value (where the bandwidth threshold value is one possible criterion of the burst criteria), if a latency increases above a threshold value, if a central processing unit (CPU) or GPU utilization increases above a specified threshold (or any combination of these or other suitable leading indicator parameters), there may be an indication that an expected burst is about to occur in a predicted amount of time (e.g., within the next seconds, minutes, etc.). For example, there may be an indication that the first cloud computing resource 102 will likely experience a burst of task demand that exceeds, is predicted to exceed, etc., an operating capacity of the first cloud computing resource 102 or impairs performance of the first cloud computing resource 102).

As mentioned above, any suitable metrics of the system may be measured, such as a bandwidth metric, a latency, a GPU processing metric, a processor metric, a storage metric, etc., and these metrics may be measured using any suitable computer components, processes, etc. In some implementations, a multi-dimensional set of metrics may be measured, where the set of metrics is indicative of an expected subsequent burst within a specified time period when the set of parameters satisfies the first and/or second burst criteria.

In various implementations, the system 100 may also monitor for leading indicators of downtime, in order to let resources go as appropriate in order to avoid additional costs. For example, the system 100 may monitor leading indicators that suggest a burst is about to end, or has ended, and then release the provisioned task instance 110. The leading indicators for determining when a burst is ending may be the same or different as the leading indicators used to determine when a burst is about to occur.

The type of leading indicators used to predict a burst (or the end of a burst), may depend on a workload definition. The workload definition may specify important performance characteristics that correspond to the cloud computing task instance 108. For example, different cloud computing task instances may use CPUs, GPUs, TPUs, ASIC circuits, FPGAs, etc., and the workload definition may specify operating parameters of the components specifically used by the cloud computing task instance 108 that are included as leading indicators. As explained further below, in some implementations the system 100 may use historical data, such as vector-based anomaly detection, in order to determine which parameters are the most useful leading indicators based on past performance.

The type of GPU used by a task instance 108 may be important where one GPU is less expensive (although less powerful) to perform the same work. In that case, the system 100 may specify the workload definition to include the type of GPU needed by the task instance 108, and look for the type of GPU when searching additional cloud computing resources for provisioning additional task instances in the event of a burst. Different types of GPUs may be needed for different types of tasks, such as rendering tasks, ray tracing tasks, machine learning tasks, modeling tasks, simulation tasks, hashing tasks, blockchain or distributed ledger tasks, etc.

Provisioning the task instance 110 on the second cloud computing resource 104 may include allocating one or more components of the second cloud computing resource 104, without actually performing the at least one portion 112 of the cloud computing task 108 with the provisioned task instance 110 on the second cloud computing resource 104 until the one or more leading indicator parameters satisfy the second burst criteria.

For example, when the first burst criteria are satisfied, resources may be pre-provisioned at a remote facility (e.g., the second cloud computing resource 104). Pre-provisioning may not incur costs, or may incur reduced costs, while the first cloud computing resource 102 continued monitoring the leading indicator(s) to determine whether a transfer to the second cloud computing resource 104 is needed or desired.

Once the second burst criteria are satisfied, the provisioned task instance 110 may be fully utilized. For example, the second burst criteria may be indicative that a cost of performing the at least one portion 112 of the cloud computing task 108 using the provisioned task instance 110 on the second cloud computing resource 104 is lower than a cost associated with performing the at least one portion 112 of the cloud computing task 108 using the first cloud computing resource 102.

The cost differences may be determined by comparing a cost of losing or dropping performance of the portion 112 of the cloud computing task 108, versus a cost to provision the new task instance 110. For example, if the cost of losing performance would be ten dollars and the cost of provisioning the new task instance is nine dollars, it would be cost effective to provision the new task instance 110 and the second burst criteria may be satisfied. The first burst criteria and the second burst criteria may be modifiable according to a peak demand schedule of the second cloud computing resource 104.

It should be appreciated that techniques disclosed herein may give rise to supporting a for-fee service for managing cloud computing resources based on "bursting". Thus, subject matter described herein may include Bursting as a Service (BaaS), where bursting functionality, capabilities, etc., can be purchased according to a fee schedule. For example, when there are multiple cloud instances from different paying clients running on a hardware system, the clients can purchase, bid on, etc., bursting priorities. Such an approach is advantageous because it permits the cloud vendor to prioritize which clients are able to burst into the limited hardware resources.

In such embodiments, the concept of a "burst" can be quantified according to various attributes or parameters, including but not limited to hardware allocations, software provisioning, memory utilization, etc. Such attributes can be used to quantify a cost of a burst, insurance, etc., that will be guaranteed to a client. More specifically, a burst can be considered as a manageable object in the cloud computing space, where the manageable object is an object in a computer science sense. Burst objects can be instantiated, constructed, deconstructed, indexed, monitored, logged, inventoried, otherwise managed, etc.

As shown in FIG. 1, the system 100 may include a BaaS user interface (UI) as part of a user device 124 for displaying one or more values associated with burst instance management in the system 100. For example, the user interface may display one or more expected performance values for performing the at least one portion 112 of the cloud computing task 108 using the first cloud computing resource 102, one or more expected performance values for performing the at least one portion 112 of the cloud computing task 108 using the provisioned task instance 110 on the second cloud computing resource 104, a comparison of performing the at least one portion 112 of the cloud computing task 108 using the first cloud computing resource 102 and performing the at least one portion 112 of the cloud computing task 108 using the second cloud computing resource 104, etc.

In various implementations, application programming interfaces (APIs) may be used to obtain cost estimates from cloud computing resources, such as a snapshot of current instance costs, or an expected cost to reserve an instance for a specified future time period. The system 100 may purchase reserve instances that give rise to secondary markets for licensing the reserve instances to others. For example, the user device 124 may use APIs to obtain expected cost values from the first cloud computing resource 102, the second cloud computing resource 104, and the third cloud computing resource 116, for future time periods. If the expected cost values satisfy cost reservation criteria (such as the cost being less than a specified cost threshold or less than an average cost by a specified percentage), the user device 124 may be used to reserve instances on the first cloud computing resource 102, the second cloud computing resource 104, and the third cloud computing resource 116.

After the instances have been reserved, the system 100 may allow for auctioning off of reserve instances to other systems or users. For example, the system 100 may operate an auction service where other systems or users can bid on available instances that have been reserved by the system 100 on the first cloud computing resource 102, the second cloud computing resource 104, and the third cloud computing resource 116. The reserve instances may be licensed to the other system or users at a higher price than the initial reservation cost by the system 100.

In various implementations, the system 100 may selectively determine which reserved instances to provide for auction to other users, and which reserved instances to hold for use by the system 100. The determination may be made based on specified reservation usage criteria, which may include tradeoffs between the purchase price for the reserved instances, the latency for the reserved instances, other definitions of workloads for cloud computing tasks, etc.

The user device 124 may provide a monitoring tool for observing the leading indicator parameters (e.g., in real-time). One example monitoring tool is OpenNMS (See URL www.opennms.com), which may provide an event-driven architecture that allows flexible workflow integration in monitoring and management stacks. The monitoring tool may normalize device-specific messages, vendor-specific messages, protocol-specific performance measurements, etc.

Returning to the concept of managing bursts as manageable objects, each type of burst object can be assigned a type indicator (e.g., GUID, UUID, MIB value, etc.), which can then be integrated into the monitoring tool. The monitoring tools, such as OpenNMS, can then treat the burst object in a similar manner as any other device or object in a network system. Thus, the monitoring tool can provide management services to the user (e.g., notification, alarm forwarding, ticking information, billing, etc.).

Data from the OpenNMS network management solution may be fed into bursting features, for use as leading indicator parameters. For example, some or all of the network parameters that are monitored by the OpenNMS system may be automatically supplied to the system 100 to enhance the ability to detect burst objects, by providing a more efficient and robust leading indicator set. The user device 124 may provide one or more dashboards for displaying relevant leading indicator values, for selecting which monitored parameters of the OpenNMS system will be used as leading indicators, etc. The parameters, metrics, or other information related to management of burst behaviors may be managed via MIB. Examples of techniques that may be adapted for mapping burst behaviors to MIBs or other network-like management structures are described in U.S. Pat. No. 10,594,549 to Soon-Shiong et al., titled "Fine Grained Network Management to Edge Devices Features", issued Mar. 17, 2020. This patent is hereby incorporated by reference in its entirety.

The user device 124 may send alerts to on-call system engineers using a variety of notification strategies, may be used to determine when to transfer performance of the cloud computing task 108 to the second cloud computing resource 104, may be used to modify the first and second burst criteria based on the leading indicator parameters, etc. The monitoring tool of the user device 124 may extend the platform by using native Java API or running scripts on an underlying operating system. For example, e-mails may be generated with an SMTP/s protocol, events may be monitored through SNMP (See U.S. Pat. No. 10,594,549 referenced above), etc.

The cloud computing task 108 may be any suitable process performed by the first cloud computing resource 102, such as a graphics processing unit (GPU) task, a rendering task, a cryptographic task, a blockchain task, a gaming task, an entertainment task, a storage task, an application specific task, an operating system task, a virtual machine task, a machine learning task, a simulation task, a data transmission task, a genomic analysis task, a data storage task, a data processing task, a communication task, a client service task, a server task, a load balancing task, another type of computing task, etc.

Provisioning of resources may depend on the type of resources that correspond to the type of the cloud computing task 108. For example, different cloud computing tasks 108 may require different resources, such as tensor processing units (TPUs), hard disk drives (HDDs), graphics processing units (GPUs), computer processing units (CPUs), various types of memories, specific software applications or agents, etc. When additional task instances are provisioned, the system 100 may first identify a type of the task instance, and then search for the best cloud computing resources that offer the specific resources needed by the identified type of task instance.

As mentioned above, any suitable type of cloud computing task 108 may be implemented by the system 100. For example, in a gaming application the user may desire to have a lowest latency connection to the game. In that case, the system 100 may search for cloud computing resources that offer low latency for the user as a highest priority. This may be particularly important where the cloud computing task 108 includes a competition, such as eSports provisioning.

In various implementations, user may desire to use Kubernetes for machine learning applications. The system 100 may instantiate Kubernetes for developers to work on machine learning applications, and provision additional Kubernetes containers on other cloud computing resources when burst instances occur. In addition to determining when to instantiate a new instance on another cloud computing resource, the system 100 may also monitor the additional cloud computing resource to determine when it is no longer in use. For example, if the provisioned resource usage declines or stops altogether, the system 100 may release or deallocate the additional resource to reduce costs.

The system 100 may allow for monitoring of activities by the cloud computing task instance 108 and/or the provisioned task instance 110, to determine whether the cloud computing task instance 108 and/or the provisioned task instance 110 are causing conflicts with other system applications. For example, the system 100 may have various teams or applications that work simultaneously, and the system 100 may continuously monitor the provisioning of instances across cloud computing resources for the various teams or applications to make sure they do not conflict with one another.

Teams or applications may create new leading indicators for other cloud computing task instances that belong to the same system 100, and the system 100 may balance between the instances of the different teams or applications to avoid incurring extra costs for unnecessary bursting. For example, the system 100 may manage a quality of service (QoS) among multiple different workloads that belong to the system 100, in order to avoid burst situations. The system 100 may determine which instances have priority over other instances, according to the type of processes being performed by each instance. For example, urgent tasks such as live-streaming may take priority over less time-sensitive tasks performed by other applications of the same system 100 (such as post-production processing or machine learning processing).

In some embodiments, the first cloud computing resource 102 may be located geographically remote from the second cloud computing resource 104. Each cloud computing resource may include any suitable devices, services, implementations, etc. for performing cloud computing tasks. For example, each cloud computing device may include an AMAZON WEB SERVICES (AWS) resource, a GOOGLE CLOUD resource, a proprietary cloud resource, a MICROSOFT AZURE resource, etc. Thus, in some embodiments, the provisioning capability can be performed based on differences in operating parameters among a heterogeneous mix of cloud computing resources. For example, if a burst provisioning must take place from AWS to a different provider, the burst provisioning can depend on factors of the target cloud system, such as cost, incurred latency, available resources, bandwidth, geo-location, power costs, other factors, etc.

In various implementations, the system 100 may manage a chain of bursts between multiple cloud computing resources. For example, the first cloud computing resource 102 may transfer the cloud computing task portion 112 to the provisioned task instance 110 of the second cloud computing resource 104 as a burst occurs at the first cloud computing resource 102. If resources run low at the second cloud computing resource 104 (e.g., an incoming burst is determined at the second cloud computing resource 104), the provisioned task instance 110 may be transferred to the additional provisioned task instance 118 at the third cloud computing resource 116.

The transfer of the cloud computing task portion from the second cloud computing resource 104 to the third cloud computing resource 116 may be controlled by the first cloud computing resource 102 (or a chain management module of the system 100). In this manner, the first cloud computing resource 102 may manage a chain of bursts from one cloud computing resource to the next, and so on. Although FIG. 1 illustrates three cloud computing resources, other embodiments may include chain management of more than three cloud computing resources.

In some embodiments, the provisioned task instance 110 may be monitored, and may replicate a state of the first cloud computing resource 102, the cloud computing task 108, etc. The provisioned instance 110 may be a stateful instance or a stateless instance. The provisioned task instance 110 may be monitored and controlled to avoid bottlenecks, to implement an input buffer, for parity checking, etc.

For example, a genomic analysis workflow may require provisioning of a stateful instance, in order to maintain information across multiple states of the genomic analysis. A scheduled gaming event may use a stateful instance to obtain information about players involved in the scheduled gaming event. A stateless instance example may include rendering a frame, where the rendering process does not require information about any other frames, etc. The provisioned task instance 110 may be selected according to whether the task 108 needs to be able to access other state information.

The system 100 may include additional cloud computing resources, such as the third cloud computing resource 116 illustrated in FIG. 1. The first cloud computing resource 102 may be configured to provision another task instance 118 on the third cloud computing resource 116 for performing at least one other portion 120 of the cloud computing task 108, in response to the one or more leading indicator parameters satisfying the first burst criteria.

The first cloud computing resource 102 may be configured to provision different portions (e.g., portions 112 and 120) of the cloud computing task 108 to the second cloud computing resource 104 and to the third cloud computing resource 116, according to defined performance capabilities of the second cloud computing resource 104 and to the third cloud computing resource 116 that correspond to a defined property of each portion (e.g., portions 112 and 120) of the cloud computing task 108.

For example, a portion of the cloud computing task 108 that is primarily directed to large data storage sizes may be provisioned to a cloud computing resource that offers cheaper data storage costs or greater data storage availability. Similarly, a portion of the cloud computing task 108 that is primarily directed to GPU processing may be provisioned to a cloud computing resource that offers cheaper GPU processing costs or faster GPU processing capabilities.

In various implementations, a time to store or retrieve data may be used as a parameter. For example, tape storage may have a large volume while providing slow read and write times, especially in scenarios where tapes are retrieved via robots, then placed in a tape reader. Cloud computing tasks may be provisioned according to the importance of how quickly data for the task should be stored or retrieved, where time-sensitive read and write tasks are provisioned to resources having faster memory read and write times.

The system 100 may be used to implement blockchain related tasks. For example, the first cloud computing resource 102 may determine other cloud computing resources that are optimized for energy requirements to perform blockchain tasks, distributed ledger related tasks, etc. Such an approach may provide multiple technical advantages. From the perspective of monitoring the system, bursting activities (e.g., defined bursts, predicted bursts, actual bursts, provisional bursts, trending bursts, etc.) can be recorded to a ledger for tracking purposes. Such a ledger provides an authoritative source of data that can be leveraged for billing practices as well as for data analytics. This can be achieved by storing the events in "notarized" fashion on a ledger (e.g., blockchain, hash graph, distributed ledger, notarized ledger, etc.).

For example, events can be compiled into a data block. The block can be linked to other previously recorded blocks by taking a hash (e.g., SHA256, scrypt, etc.) of the current block with the hash value of the previous block as well, as any other desirable metadata. The burst data can be recorded in a private ledger, public ledger (e.g., IOTA, TRON, Ethereum, BitCoin, Dogecoin, etc.), semi-private ledger, etc., which may be formed among for-fee participants. In various implementations, each burst may be quantified as a block of data, and then archived in a notarized ledger based on a previous burst. This enables creation of an immutable log of burst activity which can be accessed later, such as for forensic purposes.

In various implementations, the system 100 may experience different types of bursts. These different types of bursts may be managed as a group, or individually. A burst blockchain block may include various information that facilitates management of individual or group bursts, such as a time of the burst, resources required by the type of burst, an owner of the computing task instance, actual data associated with the computing task instance, etc. The system 100 may provision tasks for each type of burst according to the data associated with the burst blockchain block.

Different available cloud computing devices may be monitored according to radio frequency identification (RFID). For example, the user interface may generate a virtual representation visible to a user of the available cloud computing resources. The user interface may include a user control to enable the user to interact with the cloud computing resources. Radio frequency identification may be used to locate and track the cloud computing resources, and select a subset of the cloud computing resources to display and control based on filter parameters (e.g., leading indicator parameters, status parameters of the different cloud computing resources, etc.).

One should appreciate that the cloud resources may include any suitable types of real physical resources, virtual resources, etc. For example, physical cloud resources may include ports, cables, racks, servers, processors, memory (e.g., RAM, Flash, etc.), storage (e.g., disks, HDD, SDD, etc.), other types of physical resources, etc. Virtual resources may include resources that represent abstractions and can include computing power, bandwidth, latency, virtual machines, object instances, other types of virtual items, etc. Example techniques that can be adapted for mapping between physical resources and virtual resources are described in U.S. Pat. No. 10,346,654 to Hochhalter et al., titled "RFID-Based Rack Inventory Management System", issued on Jul. 9, 2019, which is herein incorporated by reference in its entirety. For example, when a burst is about to occur, the burst can be digitally linked, bound, etc., to the physical resources via RFID tags. The approach provides an advantage that administrators can monitor where, how, etc., the burst impacts real-world systems, down to a fine level of granularity.

Vector-based anomaly detection may be used to monitor the status of data transmission speeds for different cloud computing resources, to monitor access speed of different cloud computing resources, etc. For example, a network fabric (e.g., the network(s) 106) can include many fungible networking nodes (e.g., cloud computing resources). Example vector-based anomaly detection techniques include those disclosed in U.S. Pat. No. 10,218,732 to Wittenschlaeger, titled "Vector-Based Anomaly Detection", filed on Feb. 26, 2019, which is herein incorporated by reference.

A nominal behavior can be established for the fabric and represented by a baseline vector of behavior metrics. Anomaly detection criteria can be derived as a function of a variation from the baseline vector based on measured vectors of behavior metrics. Nodes in the fabric can provide a status for one or more anomaly criterion, which can be aggregated to determine if an anomalous behavior has occurred, is occurring, or is about to occur. Further to this end, rather than regarding the behaviors as anomalous, observed behaviors may be considered as leading indicators. An adaptation from U.S. Pat. No. 10,218,732 includes defining one or more leading indicator thresholds around defined behavior metrics, vectors, etc. For example, a specific vector might include a first threshold indicating that a corresponding behavior exceeds nominal behavior by 10%, a second threshold indicating that the corresponding behavior is between 10% and 50%, any other type of threshold, etc. Thus, satisfaction criteria can also include conditions that depend on such vector-based leading indicator thresholds. In various implementations, network resources may be provisioned according to the leading indicators and burst criteria.

Another example of a leading indicator that can be coupled with a vector-based leading indicator includes leading indicators that represent a rate of change over time (e.g., first order derivative, second order derivative, third order derivative, forth order derivative, etc.). Such rate-based leading indicators may provide for predicting if, when, etc., a burst might occur. In some embodiments, the rate-based indicators may be related to a multi-dimensional vector as described above. Even though a current vector might not satisfy an "anomaly" criteria, its rate of change in one or more dimensions might indicate that it could satisfy a burst criteria in a certain amount of time. Thus, a new instance of the computing task can be created in anticipation of the new instance being needed. While rates of change with respect to time represent one possible set of higher order derivatives, other non-time-based derivatives may be used in various implementations, where a first parameter varies with a second parameter. For example, storage costs per unit of storage may vary as a function of a geo-location or a facility.

Looking at historical data may allow for determining which parameters of a vector of metrics are most useful in predicting burst occurrences. For example, historical vectors of metrics may be used to determine characteristics of instantiation of a provisioned task instance. The system 100 may determine parameters that were needed for a cloud computing task 108 (e.g., according to a vector of metrics for the historical cloud computing task), and then assign the parameters to the provisioned task instance 110.

The first cloud computing resource 102 may be configured to transfer (as shown by 122 in FIG. 1) the additional portion 120 of the cloud computing task 108 to the additional provisioned task instance 118 on the third cloud computing resource 116, in response to the one or more leading indicator parameters satisfying the second burst criteria. Although FIG. 1 illustrates three cloud computing resources 102, 104 and 116, other embodiments may include more or less cloud computing resources, more or less provisioned task instances, etc.

In some embodiments, multiple cloud computing resources may be used to implement application striping for the cloud computing task 108. For example, interconnected networking nodes (e.g., cloud computing resources) may offer available computing resources from a network fabric (e.g., via the one or more networks 106). The computing resources can be allocated from the networking nodes, including available processing cores or memory elements located on the networking nodes.

A software application can be stored in a system memory including memory elements allocated from the nodes. The software application (e.g., cloud computing task 108) can be disaggregated into multiple of executable portions (e.g., the portions 112 and 120) that are striped across the allocated processing cores by assigning each core a portion to execute. When the cores are authenticated with respect to their portions, the cores are allowed to execute the portions by accessing the system memory over the fabric. While executing the software application, the networking nodes having the allocated cores concurrently forward packets through the fabric. Example techniques for application striping can be found in U.S. Pat. No. 8,364,744 to Wittenschlaeger, titled "Software Application Striping", issued on Jan. 29, 2013, which is herein incorporated by reference. The concepts disclosed in U.S. Pat. No. 8,364,744 can be adapted to the disclosed approach by allocating resources when the burst criteria are satisfied.

The system 100 may include network infrastructure and/or a peering relationship between the first cloud computing resource 102 to the second cloud computing resource 104 that reduces or eliminates the cost of bandwidth for transferring data from the first cloud computing resource 102 to the second cloud computing resource 104.

This may allow bursts to be transferred to MICROSOFT AZURE cloud resources, GOOGLE cloud resources, AMAZON WEB SERVICES (AWS) cloud resources, etc., during peak demand periods on a proprietary cloud network, while permitting use of the proprietary cloud network servers during off-peak times. Some cloud resources may have very cheap off-peak spot instances, which can be resold and brokered along with the proprietary cloud network. This may allow a client to implement a cloud computing task 108 while being agnostic as to which cloud computing resource is processing the cloud computing task 108.

Cloud Computing Resource

Figure 2:
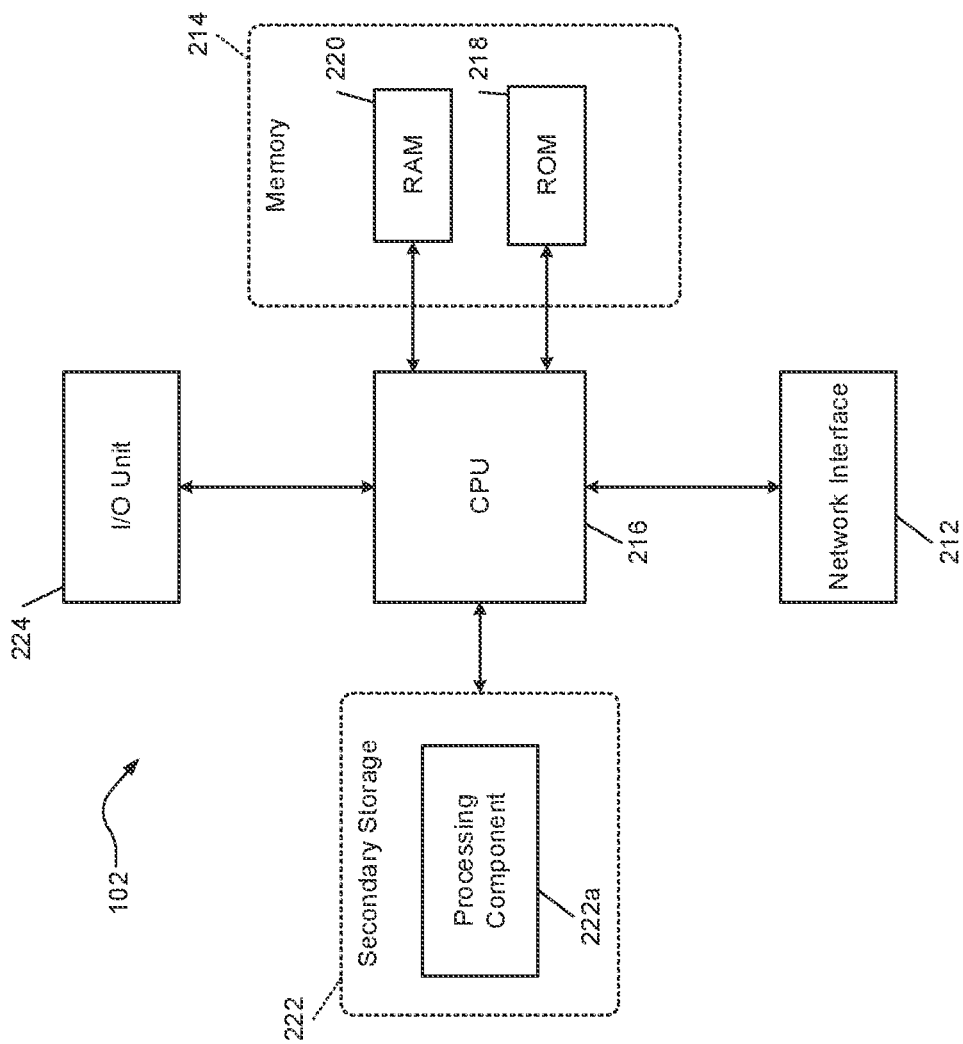
FIG. 2 is a functional block diagram of an example cloud computing resource of the system of FIG. 1.

As mentioned above, FIG. 2 illustrates a block diagram of an example cloud computing resource 102 of the system 100 of FIG. 1. The resource 102 includes a processor 216 (which may be referred to as a central processor unit or CPU) that is in communication with memory 214 including optional read only memory (ROM) 218 and optional random access memory (RAM) 220, and optional secondary storage 222 (such as disk drives, solid state drives, etc.). The processor 216 may be implemented as one or more CPU chips. The resource 102 further includes optional input/output (I/O) devices 224, and network connectivity devices (e.g., a communication interface) 212.

The secondary storage 222 typically includes of one or more disk drives or tape drives. The secondary storage 222 may be used for non-volatile storage of data and as an over-flow data storage device if RAM 220 is not large enough to hold all working data. The secondary storage 222 may be used to store programs which are loaded into RAM 220 when such programs are selected for execution.

In this embodiment, the secondary storage 222 has a processing component 222a including non-transitory instructions operative by the processor 216 to perform various operations of the methods of the present disclosure. The ROM 218 is used to store instructions and perhaps data which are read during program execution. The secondary storage 222, the memory 214, the RAM 220, and/or the ROM 218 may be referred to in some contexts as computer readable storage media and/or non-transitory computer readable media.

The optional I/O devices 224 may include printers, video monitors, liquid crystal displays (LCDs), plasma displays, touch screen displays, keyboards, keypads, switches, dials, mice, track balls, voice recognizers, card readers, paper tape readers, or other suitable input devices.

The network connectivity devices 212 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, etc. The devices 212 may promote radio communications using protocols, such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other suitable network devices.

These network connectivity devices 212 may enable the processor 216 to communicate with the Internet and/or one or more intranets. With such a network connection, it is contemplated that the processor 216 might receive information from the network, might output information to the network in the course of performing the above-described method operations, etc. Such information, which is often represented as a sequence of instructions to be executed using processor 216, may be received from and outputted to the network, for example, in the form of a computer data signal embodied in a carrier wave.

The processor 216 executes instructions, codes, computer programs, scripts which it accesses from hard disk, floppy disk, optical disk (these various disk based systems may all be considered secondary storage 222), flash drive, memory 214, ROM 218, RAM 220, the network connectivity devices 212, etc. While only one processor 216 is shown, multiple processors may be present. Thus, while instructions may be discussed as executed by a processor, the instructions may be executed simultaneously, serially, or otherwise executed by one or multiple processors.

Although the resource 102 is described with reference to a computer, it should be appreciated that the system may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. For example, in some embodiments, the computers may include a mobile device, a smart phone, a personal computer, etc. When the smart phone's capabilities are about to be exceeded, an administrative application can provision resources on the personal computer for use by the smart phone.

In an embodiment, virtualization software may be employed by the resource 102 to provide the functionality of a number of servers that is not directly bound to the number of computers in the system resource 102. In an embodiment, the functionality disclosed above may be provided by executing an application and/or applications in a cloud computing environment. Cloud computing may include providing computing services via a network connection using dynamically scalable computing resources. A cloud computing environment may be established by an enterprise and/or may be hired on an as-needed basis from a third party provider.

It is understood that by programming and/or loading executable instructions onto the resource 102, at least one of the CPU 216, the memory 214, the ROM 218, and the RAM 220 are changed, transforming the resource 102 in part into a specific purpose machine, apparatus, etc., having the novel functionality taught by the present disclosure. It is fundamental to the electrical engineering and software engineering arts that functionality that can be implemented by loading executable software into a computer can be converted to a hardware implementation by well-known design rules.

Burst Instance Management Process

Figure 3:
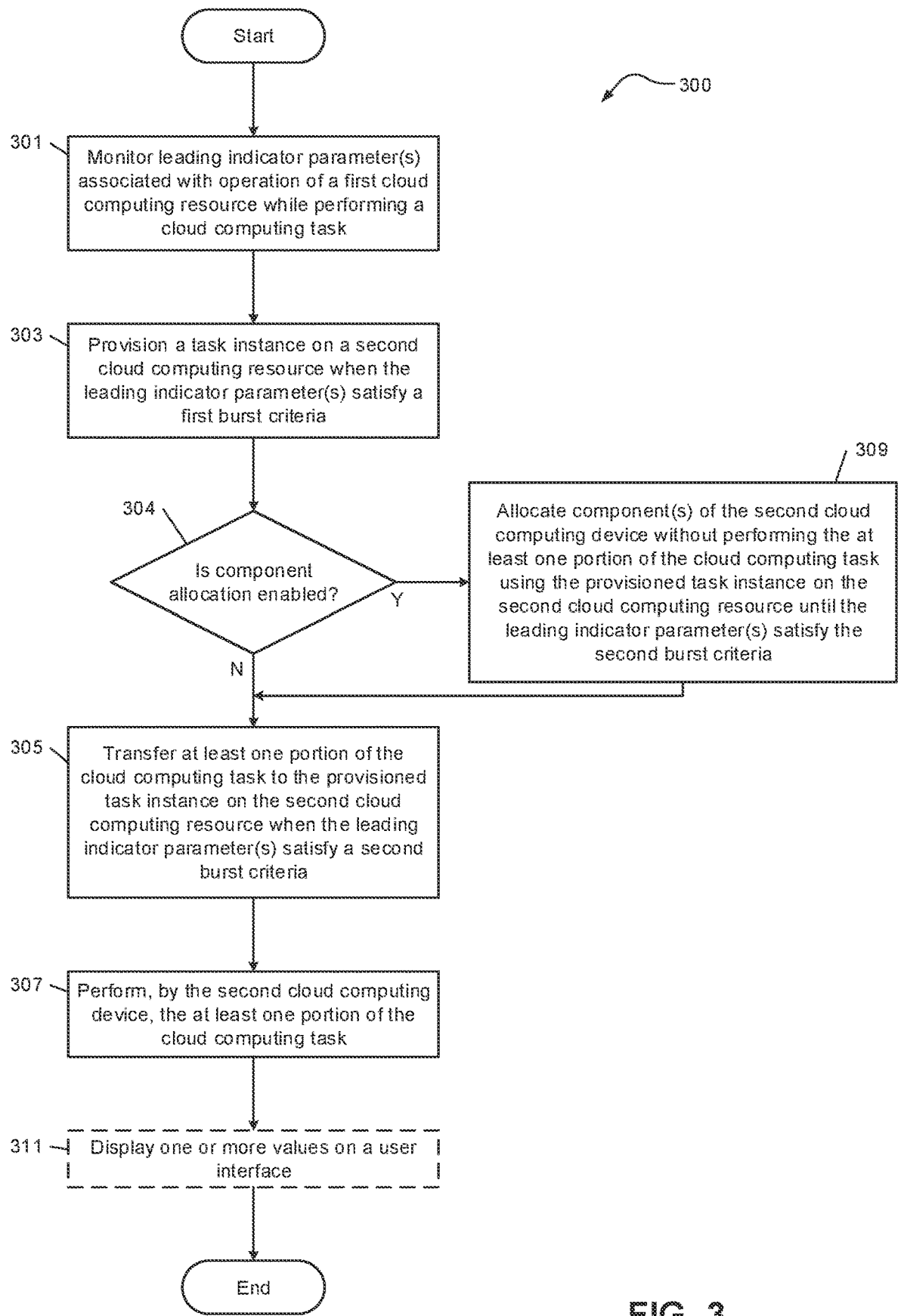
FIG. 3 is a flowchart depicting an example computer-implemented process for managing burst instances in a cloud computing system, according to another example embodiment of the present disclosure.

An example computer-implemented method 300 of managing burst instances in a cloud computing system is illustrated in FIG. 3, according to another example embodiment of the present disclosure. The system may include a first cloud computing resource having a first memory and a first processor for performing at least one cloud computing task, a second cloud computing resource having a second processor and a second memory, and one or more data networks connecting the first cloud computing resource and the second cloud computing resource, such as the system 100 illustrated in FIG. 1.

As shown in FIG. 3, the method 300 includes, at block 301, monitoring, by the first cloud computing resource, one or more leading indicator parameters associated with operation of the first cloud computing resource while performing the at least one cloud computing task. In response to the one or more leading indicator parameters satisfying a first burst criteria, the method 300 includes, at block 303, provisioning, by the first cloud computing resource, a task instance on the second cloud computing resource for performing at least one portion of the cloud computing task.

At 304, the method includes determining whether component allocation is enabled. For example, the system may be configured to allocate components of a second cloud computing device without immediately performing the cloud computing task on the second cloud computing device. If component allocation is enabled, the method proceeds to 309 to provision the task instance on the second cloud computing resource by allocating one or more components of the second cloud computing resource, and not performing the at least one portion of the cloud computing task using the provisioned task instance on the second cloud computing resource until the one or more leading indicator parameters satisfy the second burst criteria.

The method 300 includes, at block 305, transferring, by the first cloud computing resource, said at least one portion of the cloud computing task to the provisioned task instance on the second cloud computing resource in response to the one or more leading indicator parameters satisfying a second burst criteria. At block 307, the method 300 includes performing, by the second cloud computing resource, the at least one portion of the cloud computing task.

In some embodiments, the first burst criteria and/or the second burst criteria is indicative of the cloud computing task exceeding, about to exceed, predicted to exceed, etc., an operating capacity of the first cloud computing resource. The second burst criteria is indicative that a cost of performing the at least one portion of the cloud computing task using the provisioned task instance on the second cloud computing resource is lower than a cost associated with performing the at least one portion of the cloud computing task using the first cloud computing resource.

The cloud computing task may include any suitable task, such as a graphics processing unit (GPU) task, a rendering task, a cryptographic task, a homomorphic encryption task, a blockchain task, a notarized ledger task, a distributed ledger task, a gaming task, an entertainment task, a storage task, an application specific task, an operating system task, a virtual machine task, a container task, a machine learning task, a simulation task, a data transmission task, a genomic analysis task, a data storage task, a data processing task, a communication task, a client service task, a server task, a load balancing task, another other type of computing task, etc.

In some embodiments, the one or more leading indicator parameters may include a bandwidth metric, a latency, a GPU processing metric, a processor metric, a storage metric, a rate-based metric, a predication metric, etc. The one or more leading indicator parameters may comprise a multi-dimensional set of leading indicator parameters. The one or more leading indicator parameters may be indicative of a subsequent burst within a specified time period.

At block 311, the method 300 optionally includes displaying one or more values on a user interface. For example, the user interface may display one or more expected performance values for performing the at least one portion of the cloud computing task using the first cloud computing resource, one or more expected performance values for performing the at least one portion of the cloud computing task using the second cloud computing resource, a comparison of performing the at least one portion of the cloud computing task using the first cloud computing resource and performing the at least one portion of the cloud computing task using the second cloud computing resource, etc.

In some embodiments, the system may include a third cloud computing resource, and the method 300 may include provisioning, by the first cloud computing resource, another task instance on the third cloud computing resource for performing at least one other portion of the cloud computing task in response to the one or more leading indicator parameters satisfying the first burst criteria. The first and second burst criteria may be modified according to a peak demand schedule of the second cloud computing resource.

Figure 4:
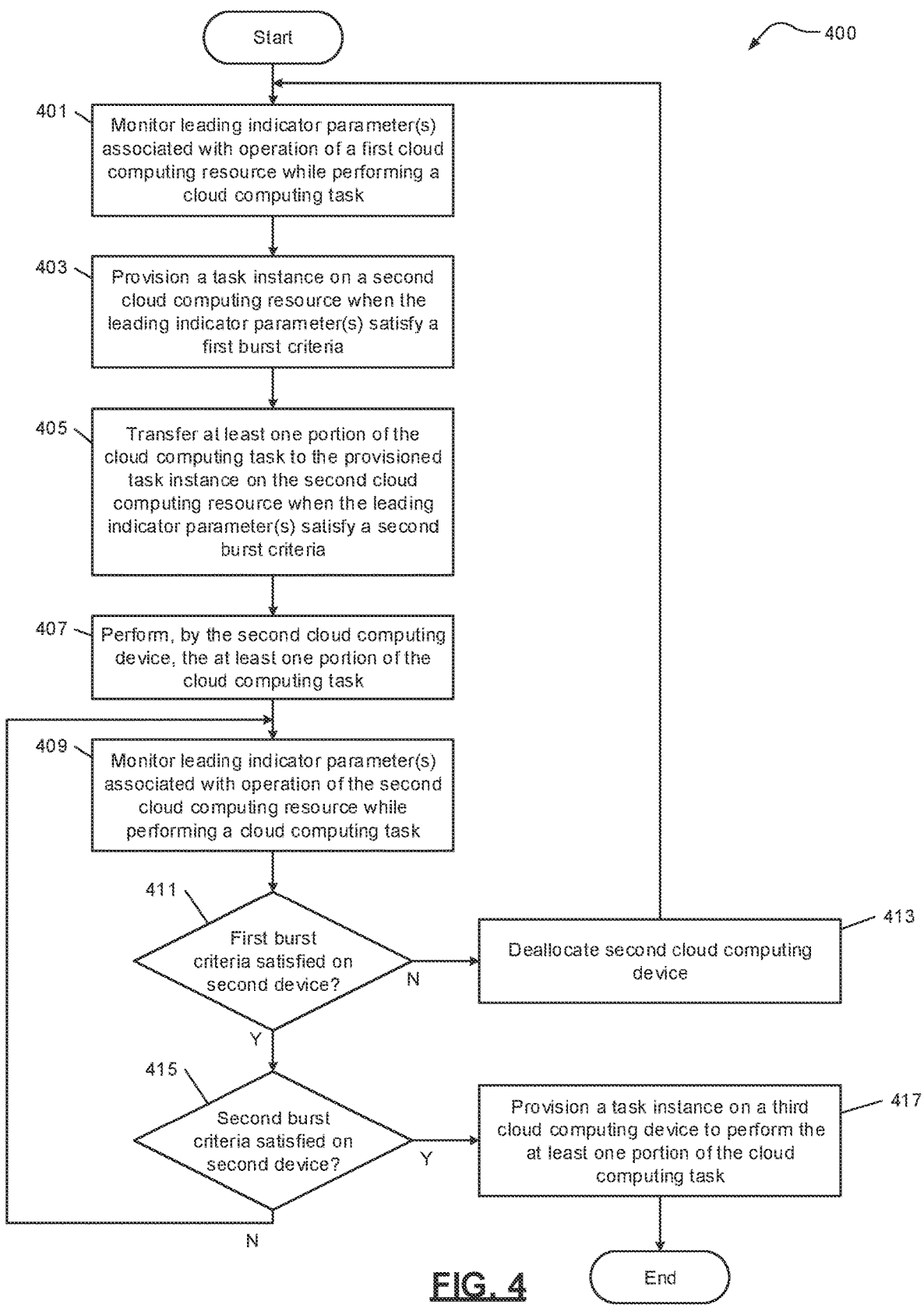
FIG. 4 is a flowchart depicting another example computer-implemented process for managing burst instances in a cloud computing system including three cloud computing resources, according to another example embodiment of the present disclosure In the drawings, reference numbers may be reused to identify similar and/or identical elements.

Another example computer-implemented method 400 of managing burst instances in a cloud computing system including at least three cloud computing resources is illustrated in FIG. 4, according to another example embodiment of the present disclosure. As shown in FIG. 4, the method 400 includes, at block 401, monitoring, by the first cloud computing resource, one or more leading indicator parameters associated with operation of the first cloud computing resource while performing the at least one cloud computing task. In response to the one or more leading indicator parameters satisfying a first burst criteria, the method 400 includes, at block 403, provisioning, by the first cloud computing resource, a task instance on the second cloud computing resource for performing at least one portion of the cloud computing task.

The method 400 includes, at block 405, transferring, by the first cloud computing resource, said at least one portion of the cloud computing task to the provisioned task instance on the second cloud computing resource in response to the one or more leading indicator parameters satisfying a second burst criteria. At block 407, the method 400 includes performing, by the second cloud computing resource, the at least one portion of the cloud computing task.

At block 409, the method 400 monitors leading indicator parameter(s) associated with operation of the second cloud computing resource while performing the cloud computing task. At 411, the method determines whether the first burst criteria are satisfied on the second cloud computing resource. If not, the method deallocates the second cloud computing resource at 413, which may include transferring the cloud computing task back to the first cloud computing device (or ending performance of the cloud computing task).

The process then returns to 401 to monitor the leading indicators on the first cloud computing resource.

If the first burst criteria are satisfied at 411, the method proceeds to 415 to determine whether the second burst criteria are satisfied on the second cloud computing resource. If not, the method returns to 409 to continue monitoring the leading indicator parameters on the second cloud computing resource. If the second burst criteria are satisfied at 415, the method provisions a task instance on a third cloud computing resource at 417, to perform the at least one portion of the cloud computing task.

In this manner, the method 400 may facilitate management of transferring the cloud computing task amongst different cloud computing resources as the cloud computing resources become overwhelmed with burst instances, while allowing for deallocation when additional cloud computing resources are no longer needed. Although FIG. 4 illustrates use of the same first and second burst criteria at 411 and 415, as the burst criteria at 403 and 405, in other embodiments the decision to deallocate at 411 and the decision to provision a third cloud computing resource at 417 may use other suitable burst criteria that is different than the criteria of 403 and 405.

According to another example embodiment of the present disclosure, a non-transitory computer readable medium includes computer-executable instructions that are executable by one or more processors. The instructions include performing, by a first cloud computing resource having a first memory and a first processor, at least one cloud computing task.

The instructions further include monitoring, by the first cloud computing resource, one or more leading indicator parameters associated with operation of the first cloud computing resource while performing the first cloud computing resource, and in response to the one or more leading indicator parameters satisfying a first burst criteria, provisioning, by the first cloud computing resource, a task instance on a second cloud computing resource for performing at least one portion of the cloud computing task.

In some embodiments, the instructions may include transferring, by the first cloud computing resource, said at least one portion of the cloud computing task to the provisioned task instance on the second cloud computing resource in response to the one or more leading indicator parameters satisfying a second burst criteria.

The first burst criteria and/or the second burst criteria may be indicative of the cloud computing task exceeding an operating capacity of the first cloud computing resource. Additionally, or alternatively, the second burst criteria may be indicative that a cost of performing the at least one portion of the cloud computing task using the provisioned instance on the second cloud computing resource is lower than a cost associated with performing the at least one portion of the cloud computing task using the first cloud computing resource.

The cloud computing task may include any suitable task, such as a graphics processing unit (GPU) task, a rendering task, a cryptographic task, a homomorphic encryption task, a blockchain task, a notarized ledger task, a distributed ledger task, a gaming task, an entertainment task, a storage task, an application specific task, an operating system task, a virtual machine task, a container task, a machine learning task, a simulation task, a data transmission task, a genomic analysis task, a data storage task, a data processing task, a communication task, a client service task, a server task, a load balancing task, another other type of computing task, etc.

The indicator parameter(s) may include any suitable metrics, such as a bandwidth metric, a latency, a GPU processing metric, a processor metric, a storage metric, etc. The leading indicator parameter(s) may comprise a multi-dimensional set of leading indicator parameters, may be indicative of a subsequent burst, a predicted burst, etc., within a specified time period, etc.

In some embodiments, the instructions may include provisioning, by the first cloud computing resource, another task instance on a third cloud computing resource for performing at least one other portion of the cloud computing task in response to the one or more leading indicator parameters satisfying the first burst criteria.

The examples above for the cloud computing burst management systems described herein are for purposes of illustration only, and are not intended to limit the scope of the present disclosure. The example systems and methods described herein could be used in any application where cloud computing tasks are performed, where computing burst instances occur, etc.

As described herein, the example systems, cloud computing resources, networks, etc. may include a microprocessor, microcontroller, integrated circuit, digital signal processor, etc., which may include memory. The example systems, cloud computing resources, networks, etc. may be configured to perform (e.g., operable to perform, etc.) any of the example processes described herein using any suitable hardware and/or software implementation. For example, the systems, cloud computing resources, networks, etc. may execute computer-executable instructions stored in memory, may include one or more logic gates, control circuitry, etc.

Leading Indicator Example Use Cases

In various implementations, parameters that are external to the network and processing performance of the system 100 itself may be used as leading indicators to predict a burst. For example, traffic sensors may be used to detect a count of cars, people, planes, etc., in order to predict incoming burst events. If an increase of people entering an office is detected, it is likely that additional storage and CPU processing will be required by the workers. The system 100 may measure the traffic, and allocate or provision resources just before the predicted burst event occurs.

For example, the system 100 may trigger allocation of additional resources when an employee badge is detected as entering a parking garage, while cloud resources may be deallocated if an employee is detected as leaving the building or having an idle workstation. The system 100 may trigger additional automated baggage scans at an airport when an increased flow of traffic to the airport is sensed, or allocate additional computer resources for airport tasks.

As described further below, gaming applications may use external parameters in order to determine when to allocate additional resources. For example, the system 100 may monitor video game reviews to identify cases of players complaining about latency for a game, and then allocate additional resources for the game to address the latency issues. In the streaming video context, the system 100 may look for parameters such as users increasing their amount of rewinding activity, in order to determine that the streaming service is slowing down and additional resources should be allocated. For example, the system 100 may trigger allocation of additional resources when sales of the game spike at a location (e.g. apple app store, google play store, steam or other digital stores) or a combination of locations. The spike does not have to be of the complete game, and may include an in-game purchase such as a single level/scene, a game pass, a gameplay type (e.g. battle royale, capture the flag, king of the hill, etc.) Another trigger for the system may include content that is allowed in the game, such as whether vehicles are being allowed in, the type of vehicles allowed, the weapons available during, etc., which may make a big difference in the resources needed (e.g. if all plays are only allowed to use machetes the resources needed will be much smaller than when using rifles, drones, guided missiles, etc.).

In various implementations, genomic workflows may allocate resources according to a time that a cell is loaded in the flow, where the system is expected to be ready to receive data at a future specified time period (such as 48 hours). A pathology analysis of slides may include a workflow that combines CPU and GPU processing. In that case, the system 100 may identify cloud computing resources that include CPU and GPU processing for provisioning task instances of the pathology analysis.

For digital histopathology, the system 100 may create batch jobs. For example, a CPU bound job of cell counting may take a specified time period to complete, such as about one hour. At a larger scale, the system 100 may focus on CPU loads, although a GPU may only require a few minutes. The system 100 may look at a ratio of types of different tasks in order to determine what instances on what cloud computing resources should be provisioned. Various models may be to identify tumor infiltrating lymphocytes (TILs), cell counts, mutations, tissue types, mark-ups (e.g., metadata), etc.

Other example requirements for genomic workflows may include BAM file requirements for storage (such as storage volume and read/write speeds), streaming speeds and latency, etc. In some cases, the system 100 may be configured according to workday hours, where additional resources are allocated during normal working hours and the resources are deallocated outside of normal working hours.

In various implementations, machine learning tasks may include allocation of resources according to parameters such as times that scientists create notebooks (such as computer-implemented notebooks like Jupyter notebooks). The system 100 may detect which packages are imported into a notebook, in order to prepare resources that are specifically used by the detected packages.

The system 100 may review source code of an application to determine the type of resources that will be needed (such as resources specific to functions called by the source code), and provision cloud computing resources that match the identified type of resources used by the source code. As another example, the system 100 may review historical data to determine resources that have previously been used by an application, in order to provision cloud computing resources that include those historically used resources.

In various implementations, the system 100 may identify a number of sensors that are used for an application, in order to determine what cloud computing resources should be provisioned (such as a number of sensors that will be used to create an augmented reality (AR) model). The number of sensors used for an application, or fees for sensors, may determine an amount of resources necessary to properly render an image or other data. The system 100 may identify an amount of instances or cloud computing resources to provision based on the identified number of sensors.

Media applications may use various inputs as leading indicators to determine an amount of resources that need to be provisioned for a burst case. For example, application tasks may include broadcasting, transcoding, feeds, rendering, etc., and the system 100 may use various inputs to determine which cloud computing resources should be allocated to handle a burst according to the type of task.

The needed resource allocation may depend on a shooting schedule for the application, use of LED walls, prioritizing latency, prioritizing bandwidth for a design studio, etc. In some cases, the system 100 may attempt to achieve live or real-time processing during shooting, thus eliminating the need to carry hard drives. The system 100 may facilitate realization of a digital or virtual studio environment based on resource allocation. In various implementations, influencer users may trigger use of resources by their followers, and the system 100 may monitor activity of the influencer to determine when to allocate resources for the followers.

The system 100 may provide real-time bottleneck detection, and provision resources when the bottleneck is detected. The system 100 may log events and parameters associated with the events, for future planning purposes. For example, a generic utility may be used to monitor bottlenecks such as a CPU bound condition, a storage bound condition, a bandwidth bound condition, etc.

As mentioned above, the system 100 facilitate cloud computing resource allocation in a variety of gaming application contexts. For example, the system 100 may provision instances on cloud computing resources based on a geographic location of players or a gaming event (such as a live competition, eSporting event, etc.). The system 100 may allocate resources according to the number of players belonging to specific groups or guilds within a game, or a schedule of streaming events for a game (such as increasing resources for a game that is experiencing a high amount of viewership on a streaming platform such as Twitch). Simulations that incur large resources for rendering, such as simulated marble runs, may have cloud computing resources provisioned before the start of the simulation, or when a burst is predicted during the simulation.

In various implementations, the system 100 may determine the type of resource that is needed to handle a burst and the cost of the resource, before determining what kind of cloud service should be requested. For example, the system 100 may determine whether it would be cheaper to run the task on a CPU or a GPU, which key resources are most important for the task (e.g., a CPU-heavy task versus a RAM-heavy task versus a CPU-heavy task, etc.).

In some cases, tasks may be split between multiple services (e.g., AWS, Azure, etc.) depending on the cost of each task. For example, geo-location cloud services may be cheapest from Microsoft's Azure at a specified time, while GPU rendering services are cheapest from AWS. The system 100 may provision tasks related to geo-location on an Azure resource instance, while provisioning tasks of a same application that are related to rendering to the AWS resource instance.

In various implementations, the system 100 may allocate resources based on a location(s) of users of an application, based on responsiveness or latency required by the users, etc. For example, a video game that requires low latency may have cloud computing resources allocated that provide the lowest latency available for the players. Distance from the server may be key to latency for the player. Therefore, the system 100 may select cloud computing resources that have the closest proximity to the player.

In contrast, processing game statistics, pre-rendering, shading, etc. for a new level in a game, may not have any latency requirements. In that case, the system 100 may select a cloud computing resource that is located much further away for use during off-peak hours, to reduce the processing cost. Similarly, when processing genomic sequences, latency may not be important. The system 100 may allocate cloud services located in a very remote geographic location (e.g., where most users are sleeping and cloud service costs are much lower), in order to perform the genomic sequence processing.

In various implementations, time-based criteria may be used as leading indicators for burst triggers, such as the time of day and a likely location where a service is expected to be needed. For example, after five P.M. there is often a spike in game activity as people get home from work and begin playing games. During holidays there are often more people playing games, or more people playing games later in the evening before a holiday.

In various implementations, application-specific burst criteria may be used as leading indicators to determine when to provision additional cloud computing resources. For example, as users log in to a game, the system 100 may anticipate a burst of gameplay cloud services being needed. The system 100 may then start to provision additional resources specific to processing gameplay tasks, in response to a large number of users logging into a game.

The burst criteria may vary for different genres of games. For example, faming type games may often have users periodically logging in throughout the day to collect resources, and the system 100 may anticipate bursts of activity around the morning, lunch, and right after work, for those types of gaming applications. The system 100 may provision additional resources ahead of those time periods.

In various implementations, cloud services may be selected based on costs of the resources at a current time, in addition to costs of the cloud service at an expected future time that the cloud service will be needed, in order to reduce the overall cost. For example, Cloud Service A may have the current lowest price for the first hour of $10 per hour, which remains constant for the next four hours. Cloud Service B may charge $14 for the current hour, then drop to $5 per hour after. If the system 100 expects to provision a cloud resource for only one hour or less, the system 100 may select Cloud Service A. If the system 100 expects to provision a cloud service for two hours or more, the system 100 may select Cloud Service B.

The system 100 may provide the option to reserve or suspend a cloud service, depending on the task need by an application (which may occur when a cloud service is reaching maximum capacity). For example, if there are only a few servers left that are currently available for a cloud computing resource, and a video game is attempting to host additional users, the high cost for additional cloud computing resources may cause the game to selectively stop or delay certain services of the game in order to avoid the cost for additional cloud computing resources.

Burst prediction may be computed when launching an application, or as part of an application or service in or for the application. These computations may be based on the state of the application, user settings, user preferences, player subscriptions, device settings, device limitations, GPS fencing, regional restrictions, type of game (e.g., fun, eSport competition, ranking game, tournament, etc.), provider settings, connections limitations, etc. For example, in a game where a player getting ready to play is about to launch a level, the game may have a lobby, and once all the players are in the lobby, the system preforms resource requirement calculations when players are ready to start, their preferences and settings are locked in, and their start locations determined. Once the calculation is complete the resources can be provisioned for the game and then the game is launched.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WWI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A cloud computing burst management system comprising:
a first cloud computing resource including a first processor and a first memory, the first cloud computing resource configured to perform at least one cloud computing task;
a second cloud computing resource including a second processor and a second memory; and
one or more data networks connecting the first cloud computing resource and the second cloud computing resource, wherein:
the first cloud computing resource is configured to monitor one or more leading indicator parameters associated with operation of the first cloud computing resource while performing the at least one cloud computing task;
in response to the one or more leading indicator parameters satisfying a first burst criteria, the first cloud computing resource is configured to provision a task instance on the second cloud computing resource for performing at least one portion of the cloud computing task; and
a third cloud computing resource, wherein:
the first cloud computing resource is configured to transfer said at least one portion of the cloud computing task to the provisioned task instance on the second cloud computing resource in response to the one or more leading indicator parameters satisfying a second burst criteria;
the second cloud computing resource is configured to perform the at least one portion of the cloud computing task;
the first cloud computing resource is configured to provision another task instance on the third cloud computing resource for performing at least one other portion of the cloud computing task in response to the one or more leading indicator parameters satisfying the first burst criteria;
the first cloud computing resource is configured to transfer said at least one portion of the cloud computing task from the provisioned task instance on the second cloud computing resource to the other provisioned task instance on the third cloud computing resource, in response to one or more leading indicator parameters of the provisioned task instance of the second cloud computing resource satisfying the second burst criteria;
the third cloud computing resource is configured to perform the transferred at least one portion of the cloud computing task; and
the first cloud computing resource is configured to provision different portions of the cloud computing task to the second cloud computing resource and to the third cloud computing resource, according to defined performance capabilities of the second cloud computing resource and to the third cloud computing resource that correspond to a defined property of each portion of the cloud computing task.

2. The system of claim 1 wherein the first burst criteria and/or the second burst criteria is indicative of the cloud computing task exceeding an operating capacity of the first cloud computing resource.

3. The system of claim 1 wherein the second burst criteria is indicative that a cost of performing the at least one portion of the cloud computing task using the provisioned task instance on the second cloud computing resource is lower than a cost associated with performing the at least one portion of the cloud computing task using the first cloud computing resource.

4. The system of claim 1 wherein the cloud computing task includes at least one of a graphics processing unit (GPU) task, a rendering task, a cryptographic task, a homomorphic encryption task, a blockchain task, a notarized ledger task, a distributed ledger task, a gaming task, an entertainment task, a storage task, an application specific task, an operating system task, a virtual machine task, a container task, a machine learning task, a simulation task, a data transmission task, a genomic analysis task, a data storage task, a data processing task, a communication task, a client service task, a server task, and a load balancing task.

5. The system of claim 1 wherein the one or more leading indicator parameters include at least one of a bandwidth metric, a latency, a GPU processing metric, a processor metric, and a storage metric.

6. The system of claim 1 wherein the one or more leading indicator parameters comprise a multi-dimensional set of leading indicator parameters.

7. The system of claim 1 wherein the one or more leading indicator parameters are indicative of an expected subsequent burst within a specified time period.

8. The system of claim 1 wherein the first cloud computing resource is located geographically remote from a location of the second cloud computing resource.

9. The system of claim 1 wherein the second cloud computing resource is configured to provision the task instance by allocating one or more components of the second cloud computing resource, and not performing the at least one portion of the cloud computing task with the provisioned task instance on the second cloud computing resource until the one or more leading indicator parameters satisfy the second burst criteria.

10. The system of claim 1 wherein:
the first cloud computing resource is configured to monitor one or more leading indicator parameters associated with operation of the second cloud computing resource while performing the at least one cloud computing task on the second cloud computing resource; and
in response to the one or more leading indicator parameters failing to satisfy the second burst criteria, the first cloud computing resource is configured to deallocate the provisioned task instance on the second cloud computing resource to stop performing the at least one portion of the cloud computing task on the second cloud computing resource.

11. The system of claim 1 further comprising a user interface configured to display at least one of:
   one or more expected performance values for performing the at least one portion of the cloud computing task using the first cloud computing resource;
   one or more expected performance values for performing the at least one portion of the cloud computing task using the provisioned task instance on the second cloud computing resource; and
   a comparison of performing the at least one portion of the cloud computing task using the first cloud computing resource and performing the at least one portion of the cloud computing task using the second cloud computing resource.

12. The system of claim 1 wherein the first cloud computing resource is configured to:
   call an application programming interface (API) of the second cloud computing resource to obtain a cost to reserve an instance on the second cloud computing resource;
   call an API of the third cloud computing resource to obtain a cost to reserve an instance on the third cloud computing resource;
   reserve one or more instances on the second cloud computing resource or the third cloud computing resource when an obtained cost satisfies a reservation criteria; and
   receive auction bid requests to license the reserved one or more instances to another user or system.

13. The system of claim 1 wherein at least one of the one or more leading indicator parameters comprises a measured parameter external to operation of the first cloud computing resource and the second cloud computing resource.

14. The system of claim 1 wherein the first burst criteria and/or the second burst criteria is modifiable according to a peak demand schedule of the second cloud computing resource.

* * * * *